Figure 1:
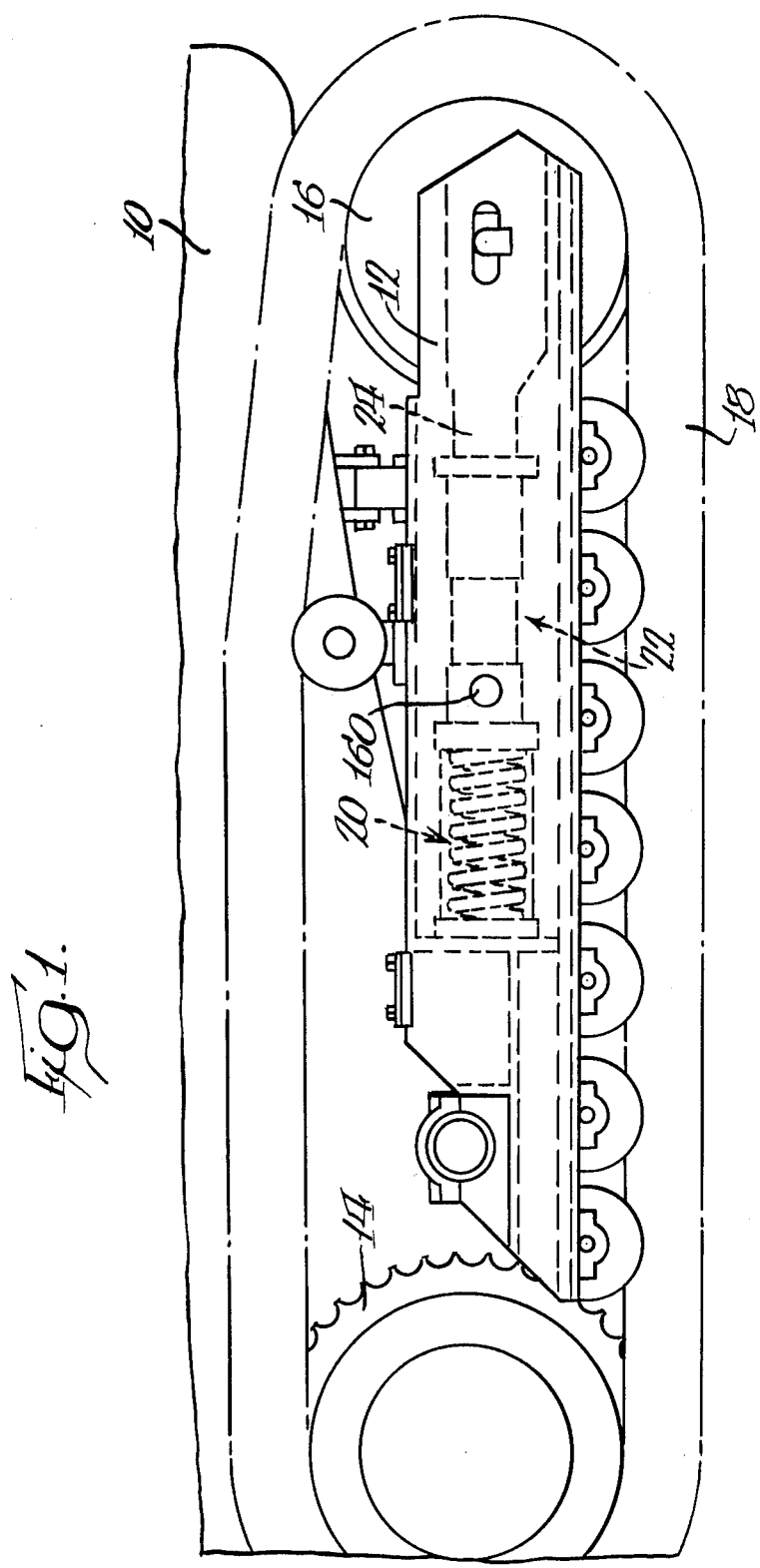

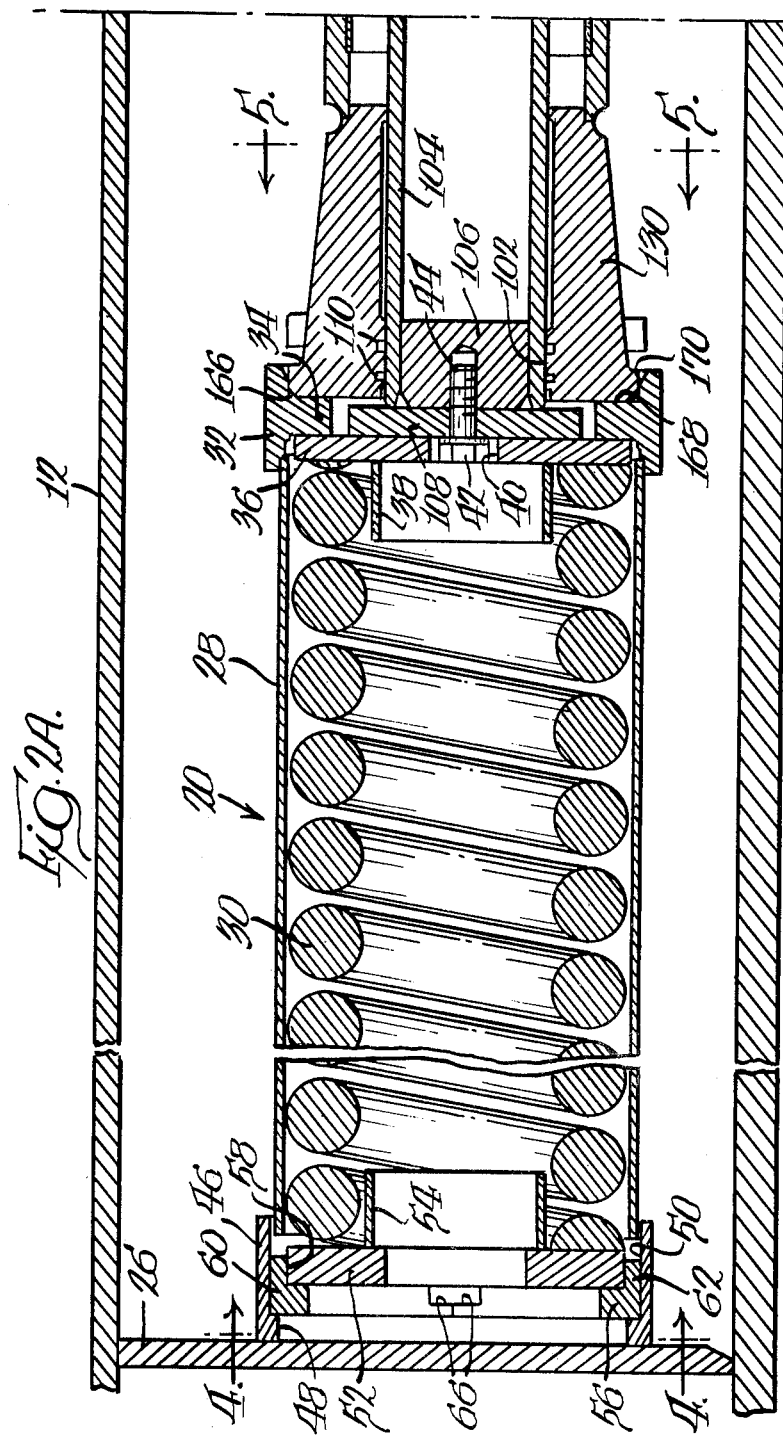

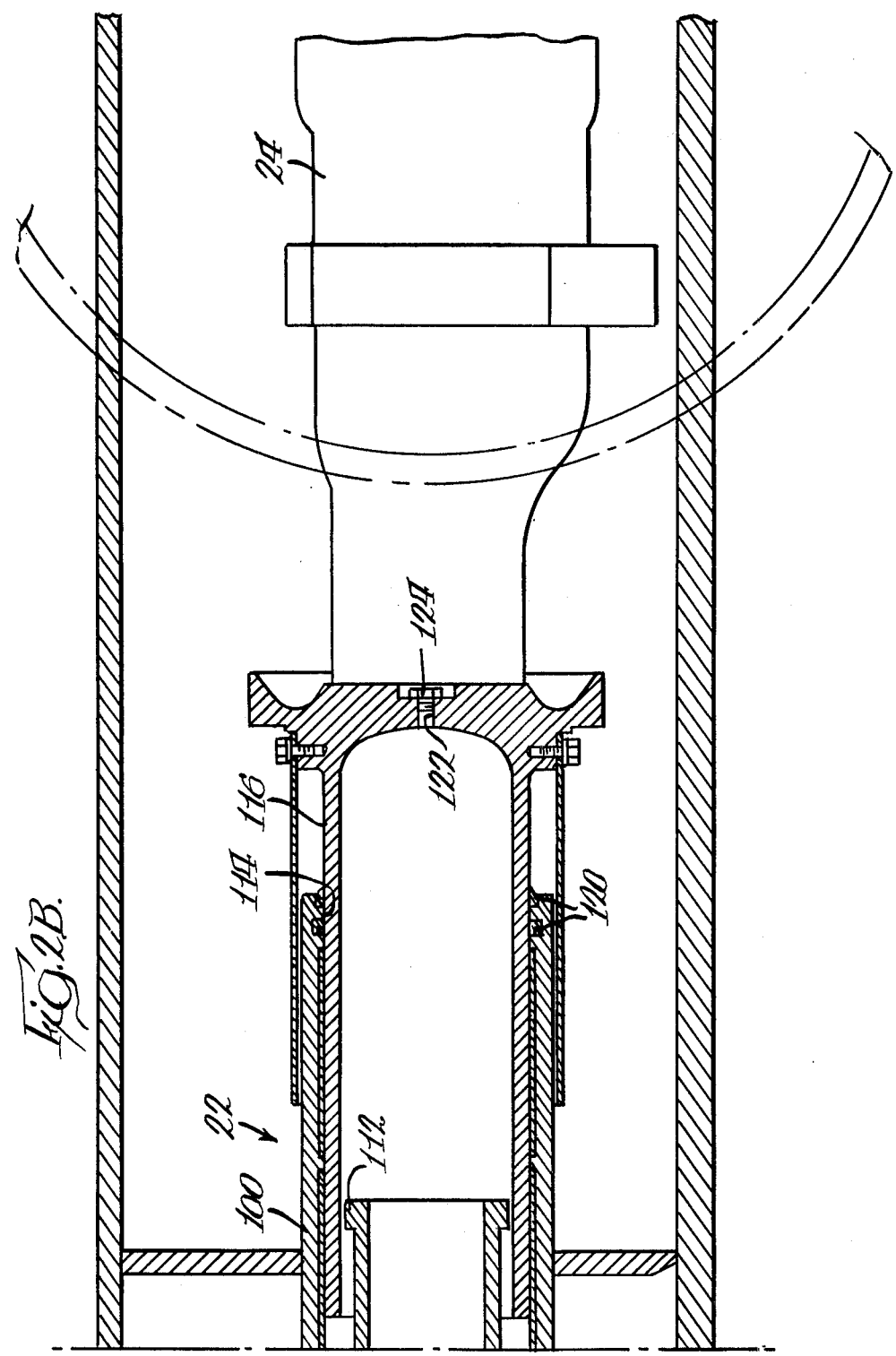

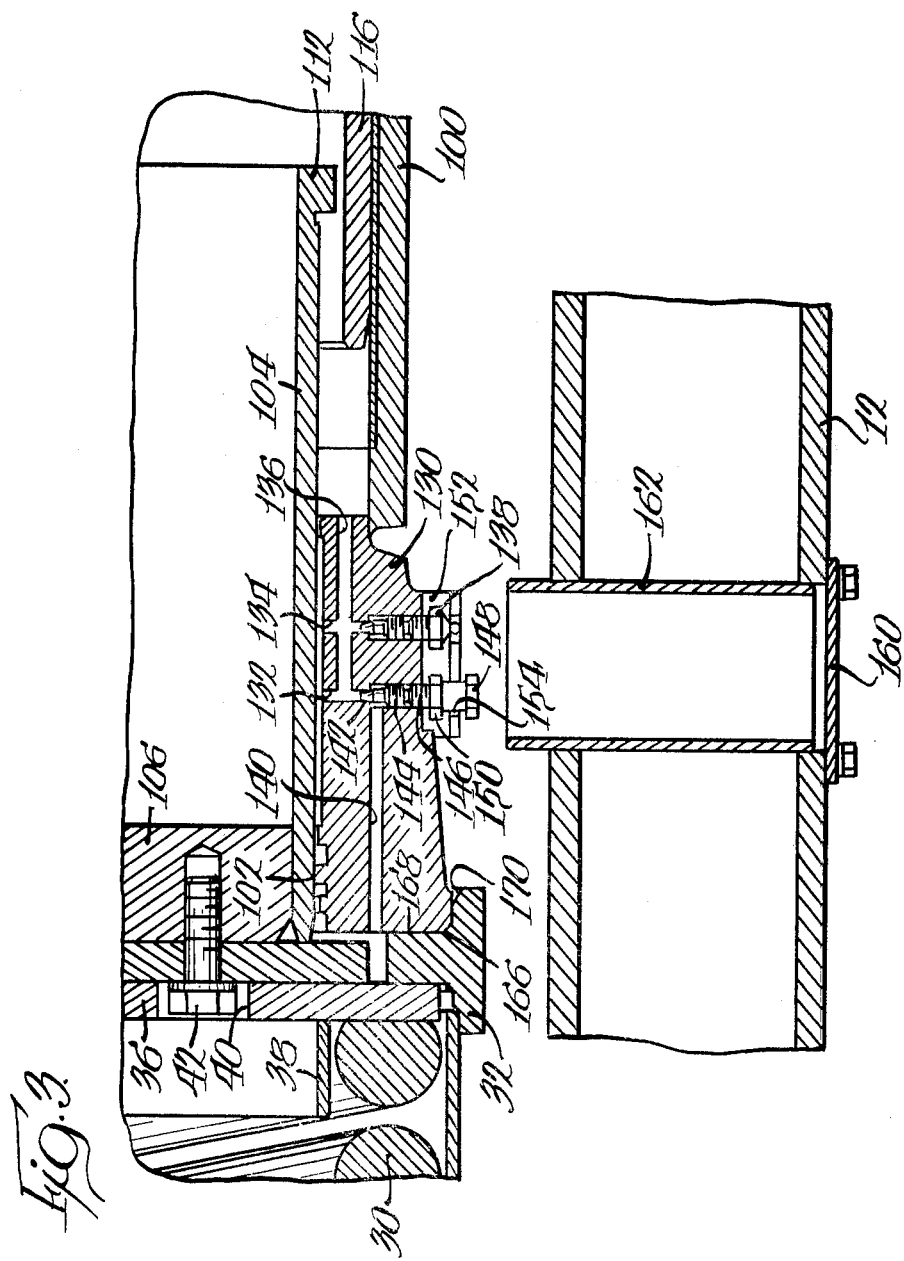

circular periphery with a diameter somewhat less than the inner diameter of the tube 28. It, like the stop 36, mounts an axially directed guide tube 54 which extends into the interior of the coil spring 30.

The stop 52 is held in place by a retainer 56 disposed in the recess 50. In the preferred embodiment, the outer perimeter of the retainer 56 is circular and of substantially the same diameter as the outer diameter of the tube 28 and of course, of greater diameter than the inner diameter of the lip 48.

On its righthand side, the retainer 46 includes an annular recess 58 of substantially the same diameter as the outer diameter of the stop 52 so as to center the same within the structure.

As best seen in FIGS. 2a and 4, the retainer 56 is composed of two split rings 60 and 62 both of which have an arc length of 180°. As can be seen in FIG. 2a, at their common diameter, that is, the line along which they are split, there is a linear recess 66 in each so that, at the above mentioned common diameter, the two split rings 60 and 62 have a reduced thickness.

To assemble the spring recoil assembly, the stop 36 is first introduced into the housing defined by the tube 28 until it abuts flange or lip 34. Thereafter, the spring 30 is introduced through the collar 46 followed by the stop 52.

The spring 30 may be slightly compressed to an axial length somewhat shorter than that illustrated in FIG. 2a and one of the split rings 60 or 62 introduced through the collar 46 to assume the location illustrated in FIG. 2a.

With the spring 30 still in a somewhat compressed state, the second split ring may then be introduced to assume its position as illustrated in FIG. 2a whereupon compression upon the spring may be relaxed so that the stop 52 enters the annular recess 58 in the split rings.

It will be noted that the axial length of the recess 50 is greater than that of either of the split rings 62 so as to enable them to be cocked with respect to the longitudinal axis of the assembly to enable insertion. It will also be observed that the reduced thickness of the split rings 60 and 62 provided by the recesses 66 further enables the last of the split rings 60 and 62 to be installed to be introduced through the collar 46 in a generally axial direction and then be moved radially into its final position.

Referring now to FIG. 4, once the spring recoil assembly 20 has been completely assembled, it is introduced into the tunnel defining the track frame 12 through its right hand end with, of course, all other components removed. It is moved along the length of the tunnel until it abuts the stop 26. And, as seen in FIG. 4, it is supported in its desired position by two, parallel spaced rails 70 and 72 near the lower side of the tunnel. In other words, the spring recoil assembly is simply slid along the length of the rails 70 and 72 until it abuts the stop 26. The assembly 20 is not attached to the stop 26 and is supported in its position only by the rails 70 and 72. Thus, installation and/or removal of the same is quite simply had.

Returning to FIGS. 2a and b, the adjuster assembly 22 will now be described in detail. The same includes an elongated, tubular, stationary housing 100 formed of two suitably joined parts. At the lefthand end of the housing 100, the same includes an opening 102 of relatively small size which slidably receives a piston 104 which is considerably elongated and which is hollow. The lefthand end of the piston 104 is closed by a block 106 suitably secured in place and the bolt 44 secures a circular plate 108 to the block 106. The plate 108 has an outer dimension slightly less than that of the lip 34 so as to enter the opening there defined and abut the stop 36. Thus, compression of the spring 30 can be had by shifting the piston 104 to the left as viewed in FIGS. 2a and b.

Suitable seals 110 are carried by the housing 100 to seal against the cylindrical surface of the piston 104.

At the end of the piston 104 opposite from the block 106, there is a radially outwardly directed projection 112 which limits, along with the plate 108, movement of the piston 104 relative to the housing 100 and captivates the piston 104 within the housing.

At the righthand end of the housing 100, there is an opening 114 of relatively large size, that is, larger than the opening 102. The opening 114 slidably and reciprocally receives an elongated, hollow piston 116. The hollow of the interior of the piston 116 is such that the piston 104 is partially movable therein. The piston 116 is sealed to the housing 100 by seals 120 carried by the latter. Its end remote from the housing 100 includes a bore 122 defining a bleed port which may be selectively closed by a threaded plug 124.

The interior of the housing 100, the piston 104, and the piston 116 defines a hydraulic chamber which typically will be filled with a relatively viscous fluid such as grease. The various components preferrably are hollow so as to maximize the size of the hydraulic fluid receiving cavity defined thereby without appreciably increasing the external dimensions of the assembly 22.

It will be observed that the piston 116 is freely removable from the remainder of the assembly 22 and this relationship serves the following purpose. With the piston 104 assembled to the housing 100, the same may be tipped on end with the righthand end of the piston 104 uppermost. Grease may then be easily and rapidly introduced into the cavities until both the hollow of the piston 104 and the interior of the housing 100 are substantially filled. The piston 116 may then be inserted within the opening 114 and, with the plug 104 removed, forced downwardly into the opening 114. Any gas, such as air, captured within the cavity can escape therefrom through the bleed passage defined by the bore 122. The process may be continued until grease oozes through the port 122 at which time the plug 124 may be threaded therein. As a consequence, the interior cavity of the adjuster 22 will be completely filled with hydraulic fluid and free of gas.

Turning to FIG. 3, the lefthand part 130 of the housing 100 includes a pair of axially spaced radial bores 132 and 134. The two extend from the interior through the exterior thereof as illustrated and intersect an axial bore 136 directed as illustrated.

On the exterior end of the bore 134, there is placed a conventional lubricant fitting 138 through which lubricant under pressure may be introduced into the interior of the housing 100 when additional grease is required to be added or for other purposes as will be seen.

Intersecting the bore 132 on the exterior side of the point of intersection with the latter with the bore 136 is an axial bore 140 which extends to the area of the plate 108. The point of intersection of the bore 140 with the bore 132 defines a valve seat 142 and a valve member 144 is disposed within the bore 132 to be urged against the seat 142 and halt fluid communication between the bore 132 and the bore 140.

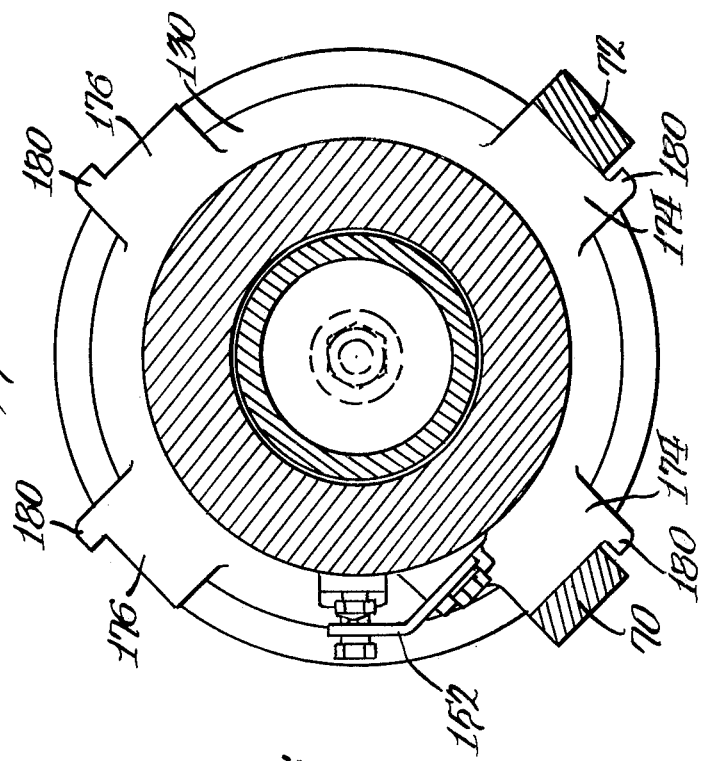
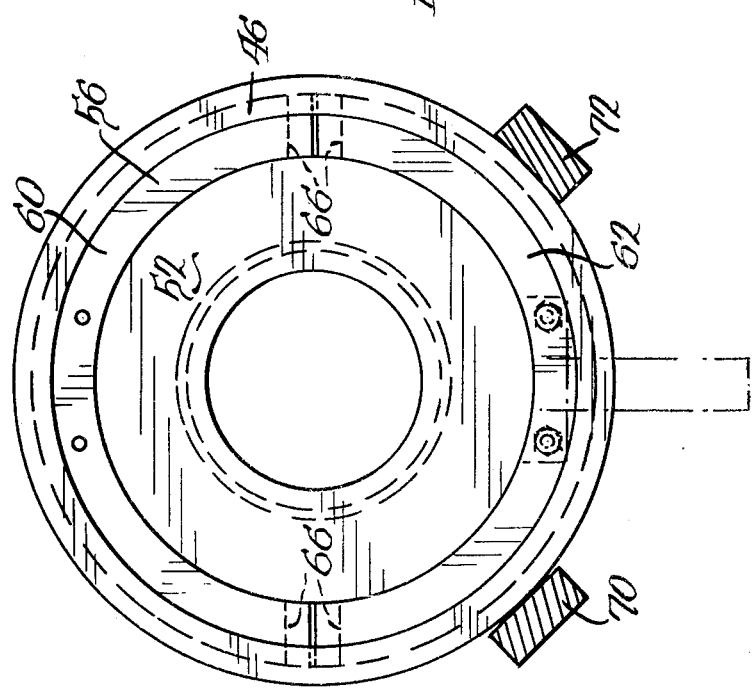

A double headed, threaded plug 146 is threaded within the exterior end of the bore 132 and can be rotated to urge the valve 144 against the seat 142 or to release pressure against the same so that internal pressure within the housing 100 will move the valve 144 away from the valve seat. When such occurs, grease under pressure may pass via the conduits 132, 134, and 136 to the conduit 140 to be directed to the interior of the spring recoil assembly 20. The purpose of this construction is to avoid any possibility that grease under pressure could be directed to an operator of the valve 144.

The outermost head 148 of the bolt 146 serves as an external actuator by which the position of the valve 144 can be suitably controlled. The inner head 150 serves as a stop preventing complete removal of the component. As can be seen in both FIGS. 3 and 5, a plate 152 is suitably secured to the housing 100 and has a slot 154 in which the double headed bolt 146 is received. When the bolt 146 is moved in a direction to open the valve 144, its movement is limited by abutment of its inner head 50 with the plate 152 thereby preventing complete removal of the components such that lubricant under pressure could exit directly through the bore 132 after the valve components have been removed.

The just described components including the grease fitting 138 and the valve 144 are disposed well within the tunnel defining the track frame 12. Since periodic access is required, as seen in FIG. 1, an access door 160 is provided in the side of the track frame 12. Within the interior of the track frame, the radially directed tube 162 extends towards the fitting 138 and the valve 144 and in alignment therewith so that access may be had thereto when required.

After grease has been introduced into the interior of the adjuster assembly 22 in the manner mentioned previously, the same is introduced into the track frame 12 through the righthanded end thereof as viewed in FIG. 1 and abutted against the righthand end of the spring recoil assembly. With reference to FIG. 2a, it will be seen that the lefthand end of the housing part 130 of the adjuster assembly includes a chamfered edge 166 at its outer diameter. The casting 32 of the spring recoil assembly includes a recess 168 sized to receive the lefthand end of the housing part 130 and its edge is chamfered as at 170.

The chamfered surfaces 166 and 170 serve as a piloting means to pilot the lefthand end of the adjuster assembly into the recess 168 so as to be in firm, relative fixed abutment with the spring recoil assembly 20 and yet be unattached thereto.

As seen in FIG. 5, the housing part 130 mounts radially outwardly directed, integral tabs in pairs 174 and 176. The tabs 174 may slide on the rails 70 and 72 as illustrated and to prevent angular rotation of the adjuster assembly 22 from the position illustrated in FIG. 5, the tabs 174 are provided with ears 180. The ears 180 serve as orienting means so as to insure that the valve 144 and the fitting 138 (FIG. 3) will be aligned with the tube 162 and the access opening 160.

Those skilled in the art will recognize that the track frames on opposite sides of a vehicle are symetrical rather than being identical. In order to enable the use of an adjuster assembly 22 in either track frame, the tabs 176 are provided in addition to the tabs 174. Thus, if the tabs 174 are utilized when the adjuster assembly 22 is introduced into the left track frame to achieve alignment as mentioned previously, the tabs 176 will be used if the adjuster assembly 122 is to be introduced into the right track frame.

After the adjuster assembly 22 has been slid along the rails 70 and 72 into abutment with the spring recoil assembly 20, the idler yoke 24 may be similarly introduced as illustrated in FIG. 2b until it is in abutment with the righthand end of the adjuster assembly 22. It is not attached thereto, however. Thereafter, the idler sprocket may be assembled to the yoke 24 and all other components, including the track 18 fully assembled. To achieve the desired preload on the spring 30 of the spring recoil assembly 20, a suitable lubricant gun may be introduced through the opening 160 and placed on the fitting 138. Additional grease may then be driven into the interior of the housing 100 until some desired pressure indicative of the desired preload is obtained.

If the desired pressure is exceeded, it is only necessary to relieve it at least in part through suitable operation of the valve 144.

INDUSTRIAL APPLICABILITY

From the foregoing, it will be appreciated that a recoil system made according to the invention utilizes modular components which may be easily installed and/or removed while in the field. Moreover, adjustment of the preload of the spring of the spring recoil assembly 20 is easily accomplished in the field requiring little more than a pressurized source of lubricant with a suitable pressure reading.

Assembly difficulties in relatively inaccessable spots such as the interior of the track frame are avoided since the components are not attached to each other but merely abut each other. Safety concerns are avoided by reason of the diversion system for grease under pressure provided by the valve 144 and the conduit 140 as well as the fact that when the idler yoke 24 is in place, the plug 124 closing the bleed passage 122 is disposed at the interface of the idler yoke 124 and the adjuster assembly 20 and therefore inaccessable.

What is claimed is:

1. A spring recoil assembly for use in a crawler type track roller frame comprising:
    elongated tubular housing (28,46) having opposed open ends and defining a spring receiving space;
    a stop (36) at least partially closing one of said ends;
    a compression coil spring (30) within said space and abutting said stop;
    radially inwardly directed lip means (48) on the other end of said housing means and having an inner diameter greater than that of said spring;
    an additional stop (52) within said other end and together with said first stop sandwiching said spring within said space, said additional stop having a periphery sized to freely pass into said space through said other end past said lip means; and
    a retainer (60,62) within said space between said additional stop and said lip means and abutting at least said lip means, said retainer having a diameter greater than said inner diameter and at least one retaining portion smaller than said additional stop periphery said retainer comprising two elements each having an arcuate outer periphery of about 180°.

2. The spring recoil assembly of claim 1 wherein said elements are defined by a split ring and have a reduced thickness (66) at their common diameter.

3. The spring recoil assembly of claim 2 wherein said elements have an annular recess (58) of a diameter such as to receive the periphery of said additional stop to substantially center the same on the axis to said housing means, said additional stop further mounting an axially directed guide tube (54) within said spring.

4. A spring recoil assembly for use in a crawler type track roller frame comprising:
    elongated tubular housing means (28,46) including a tube having opposed open ends and defining a spring receiving space;
    a stop (36) at least partially closing one of said ends;
    a compression coil spring (30) within said space and abutting said stop;
    a collar secured on the other end, said collar having an inner diameter equal to the outer diameter of said tube and having a radially inwardly directed lip means axially spaced from said other end to define a recess therebetween;
    an additional stop (52) within said recess and together with said first stop sandwiching said spring within said space, said additional stop having a periphery sized to freely pass into said recess through said other end past said lip means; and
    a retainer (60,62) within said recess between said additional stop and said lip means and abutting at least said lip means, said retainer having a diameter greater than the inner diameter of said lip means and at least one retaining portion smaller than said additional stop periphery.